E. KEMP.
ILLUMINATING SIGN FOR AUTOMOBILES.
APPLICATION FILED SEPT. 10, 1919.
1,385,006.
Patented July 19, 1921.
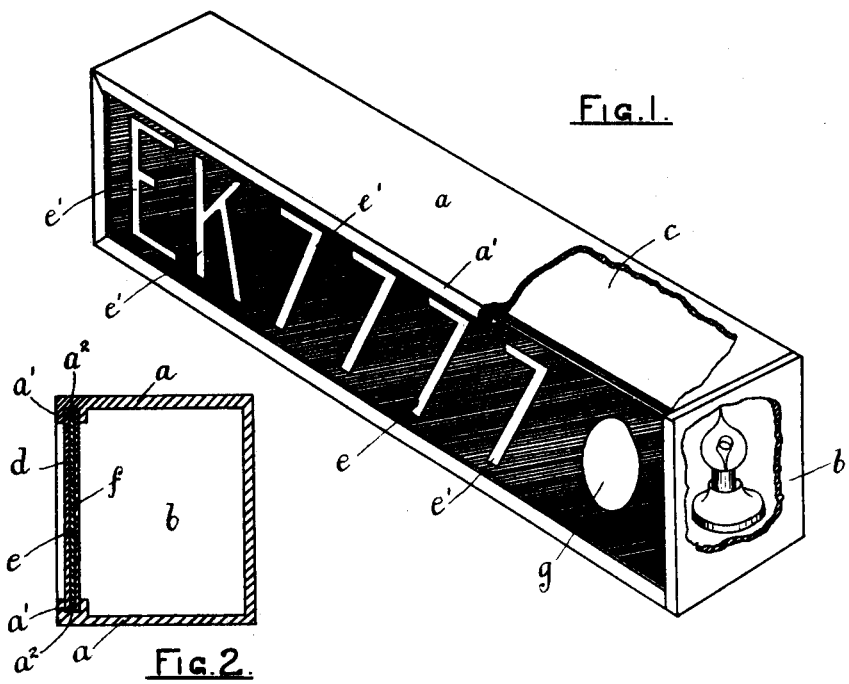
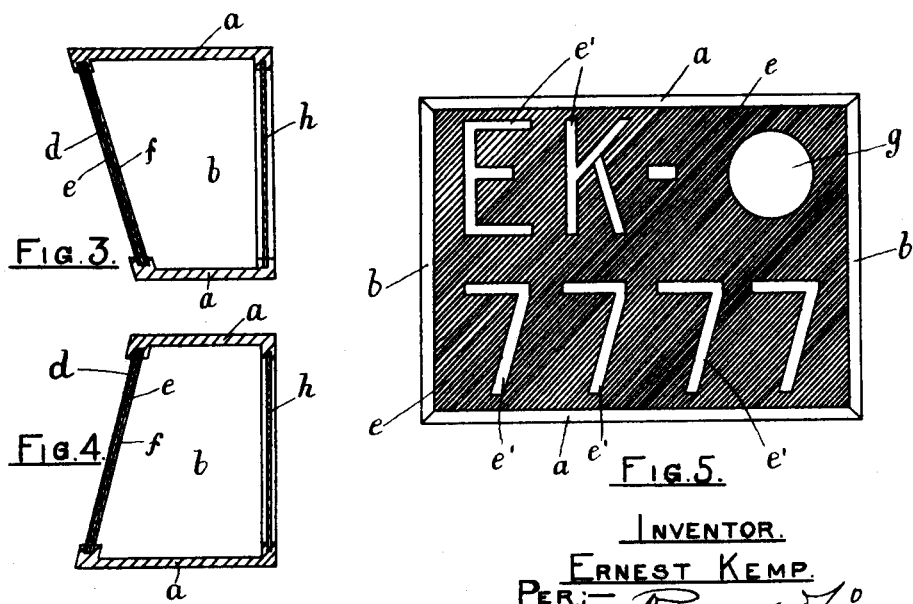
Inventor.
Ernest Kemp.
Per:— Rayner & Co
Attorneys.

UNITED STATES PATENT OFFICE.

ERNEST KEMP, OF CLAPHAM COMMON, ENGLAND.

ILLUMINATING-SIGN FOR AUTOMOBILES.

1,385,006.

Specification of Letters Patent.  Patented July 19, 1921.

Application filed September 10, 1919. Serial No. 322,925.

*To all whom it may concern:*

Be it known that I, ERNEST KEMP, subject of the King of Great Britain and Ireland, residing at 70 Canford road, West Side, Clapham Common, in the county of Surrey, England, have invented certain new and useful Improvements in Illuminating-Signs for Automobiles, of which the following is a specification.
My invention relates to an improved rear lamp and license number indicator for use in connection with automobiles and other vehicles, and consists in a construction wherein the license number plate and the red or other colored danger signal, which according to regulations must be visible from the rear of motor and other vehicles, are combined in such a manner as to be readily visible by night while the license number may also be easily seen by day. A further feature of the invention consists in arranging the device so that the license number plate, the red or other colored danger signal and the interior of the car are all illuminated from one source of light. Other important features of the invention will be referred to hereafter.

In order that the invention may be readily understood, reference is made to the accompanying drawings which show several constructions according to the invention, in which;—

Figure 1 is a perspective view partly in section showing a sign constructed according to the invention.

Fig. 2 is a cross section of Fig. 1.

Fig. 3 is a cross section of a modified construction in which the source of light is also utilized for illuminating the interior of the vehicle, from a point at or near the roof.

Fig. 4 is a similar view showing the construction where the interior of the vehicle is illuminated from a point at or near the floor.

Fig. 5 is a front elevation of a modified construction.

Similar reference letters are used to denote the same parts in all the views.

Referring to Figs. 1 and 2, the frame is constructed in the form of a substantially rectangular box or casing built up of top and bottom members $a$, ends $b$ and a rear portion $c$. The front longitudinal edges of the top and bottom members are provided with inwardly projecting extensions $a^1$ which are provided with longitudinal grooves or channels $a^2$ adapted to receive the elements constituting the license number plate or indicator which is arranged so as to render said number visible by day or night. These elements comprise a front plate $d$ of clear glass located most remote from the source of light. To the rear of the plate $d$ is placed a plate $e$ (indicated by shaded lines in Fig. 1 for the sake of clearness) bearing the license number and other lettering, such plate being of an opaque nature such as sheet metal with the necessary numerals and letters $e'$ cut or otherwise formed therein in the manner of a stencil. This plate is also provided or formed with an aperture or hole $g$ of any suitable shape, at one end adapted to be covered with a red or other colored disk or lens serving as a danger signal, which, in accordance with regulations must be visible from the rear of the vehicle. Alternatively the plate $e$ may extend to within a short distance of one end of the casing so as to form a gap into which a disk of appropriate shape and color is secured.

To the rear of the plate $e$ is placed a sheet $f$ of translucent material such as frosted or opal glass, mica, or the like which is fitted into the casing adjacent the plate $e$. This plate serves for enabling the license plate to be readily visible by day to show the characters as substantially white. The plate $f$ is of such length that while wholly covering the numerals and lettering formed in the plate $e$, it leaves the aperture $g$ of the gap at the end of the plate $e$, unobstructed.

The aperture $g$ may be covered with a disk of ruby glass, mica, or a lens with a red covering may be secured in position in said aperture or gap, preferably in such a manner as to lie in the same longitudinal plane as the translucent plate $f$. Alternatively, the translucent plate may be extended and have a red or other colored area to register with the aperture $g$ or the gap at the end of the plate $e$.

The interior of the casing carries an electric incandescent lamp or an oil or gas lamp or the like, arranged immediately behind the aperture $g$. In order to obtain a better illumination, the ends of the frame remote from the source of light may be provided with a suitable reflector or reflectors. The reflectors may comprise a prismatic glass or glasses at either side of the lamp and arranged to reflect the light on to the interior of the frame.

In the construction shown in Figs. 3 and 4, the rear of the casing is provided with a plate *h* of clear glass so as to illuminate the interior of the vehicle. In the construction shown in Fig. 3, the plates *d, e, f,* are inclined inwardly from the top to the bottom in which case the casing is secured in a suitable aperture or the like at or near the roof of the vehicle so as to illuminate the interior thereof, while in the form shown in Fig. 4, the plates *d, e, f,* are inclined inwardly from the bottom to the top and serve to illuminate the interior of the car from a point at or near the floor thereof, when secured in an aperture or the like near the lower portion of the body of the vehicle.

In the modified form shown in Fig. 5, the aperture *g* in the end of the plate *e* is located above the numbering so as to enable the casing to be formed substantially square in shape. In this case the lamp for illuminating the interior of the casing, may be secured to the top of the casing, as will be readily understood.

The casing may be provided with a lid or cover at the top for inspection purposes, or the end of the casing adjacent the source of light may be formed as a hinged or pivotal door.

What I claim as my invention and desire to obtain by Letters Patent is:—

1. A rear lamp and license number indicator for automobiles comprising a box-like casing open at its front and rear longitudinal sides, grooves formed in the top and bottom longitudinal edges of the front side for the reception of a plurality of elements constituting the license number and danger signal, said elements consisting of a front plate of clear glass wholly closing the front side, a rear plate of translucent material having a gap formed therein in the neighborhood of one end, an intermediate plate of opaque material having an aperture at one end registering with the gap in the rear plate and having the license number formed therein in the manner of a stencil, a plate of colored glass covering the gap in the rear plate, grooves at the top and bottom edges of the rear open side of the casing, a plate of clear glass slidable in said grooves wholly closing the rear open side of said casing, and a lamp located behind the plate of colored glass adapted to simultaneously illuminate the aperture in the plate of opaque material and the license number therein and to direct rays of light through the rear side of said casing substantially for the purposes set forth.

2. A rear lamp and license number indicator for automobiles comprising a box-like casing formed with an open rear side and with an open front side inclined thereto, a sheet of clear glass closing said rear side, grooves in the upper and lower longitudinal edges of the front side for the reception of a plurality of elements constituting the license number and danger signal, said elements consisting of a front plate of clear glass, a rear plate of translucent material and an intermediate plate of opaque material, the intermediate plate having the license number formed therein in the manner of a stencil, said rear and intermediate plates having a gap formed therein at one end, a disk of colored glass covering said gap, and a lamp located immediately behind said colored glass adapted to constantly and simultaneously illuminate the colored glass, the license number formed in the intermediate plate, and to throw beams of light through the rear of the casing for the purposes set forth.

ERNEST KEMP.